Aug. 4, 1964   C. V. SMYTHE ETAL   3,143,408
PESTICIDAL COMPOUND
Filed Jan. 28, 1963
3 Sheets-Sheet 1

Aug. 4, 1964
C. V. SMYTHE ET AL
PESTICIDAL COMPOUND
3,143,408
Filed Jan. 28, 1963
3 Sheets-Sheet 3
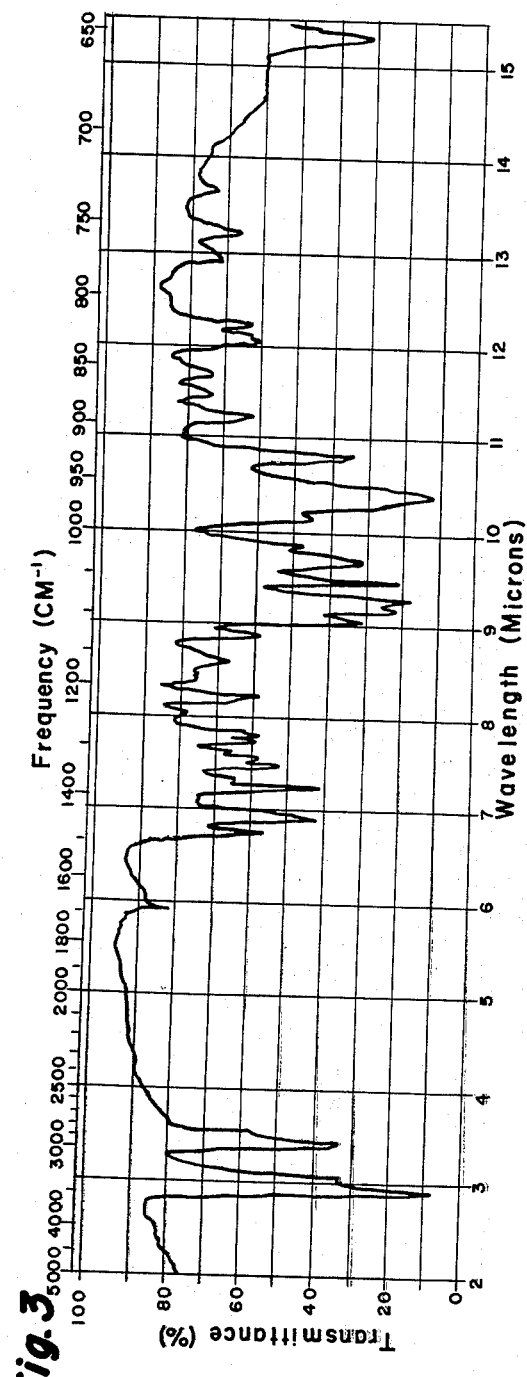
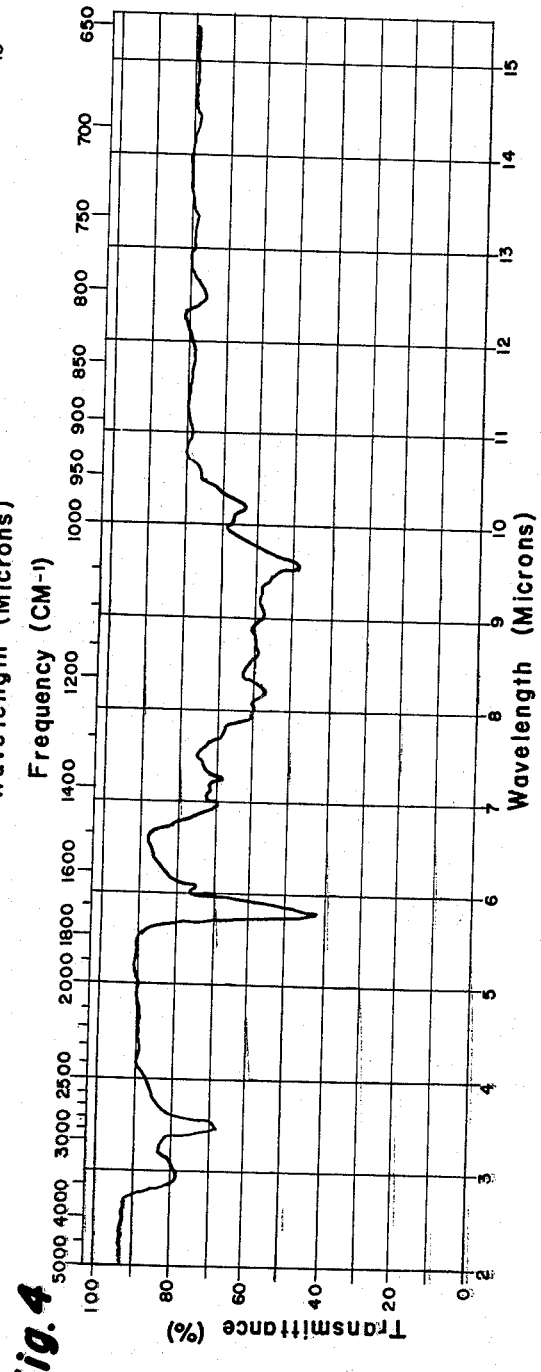

United States Patent Office 3,143,408
Patented Aug. 4, 1964

3,143,408
PESTICIDAL COMPOUND
Carl V. Smythe, Moorestown, and Kenneth S. Kraskin, Riverton, N.J., assignors to Rohm & Haas Company, Philadelphia, Pa., a corporation of Delaware
Filed Jan. 28, 1963, Ser. No. 254,304
3 Claims. (Cl. 71—2.5)

This invention is concerned with a new and useful organic chemical compound, which is a useful pesticide. The invention is also concerned with pesticidal compositions comprising this chemical compound.

The invention provides, in one of its embodiments, a new chemical compound which is characterized by the following analysis:

Molecular formula: $C_{27}H_{32}O_8$
Found (in percent):
    Carbon 66.51, 67.03
    Hydrogen 6.80, 6.77
    Oxygen 26.69, 25.20 (by difference)
Molecular weight: 512±17

An ultraviolet spectrum of the compound shows two peaks, λ max., one at 261 mµ and the other at 220.5 mµ; and Two extinction coefficient maxima, E max., one at 22,800 and the other at 21,600, respectively.

Figure 1:
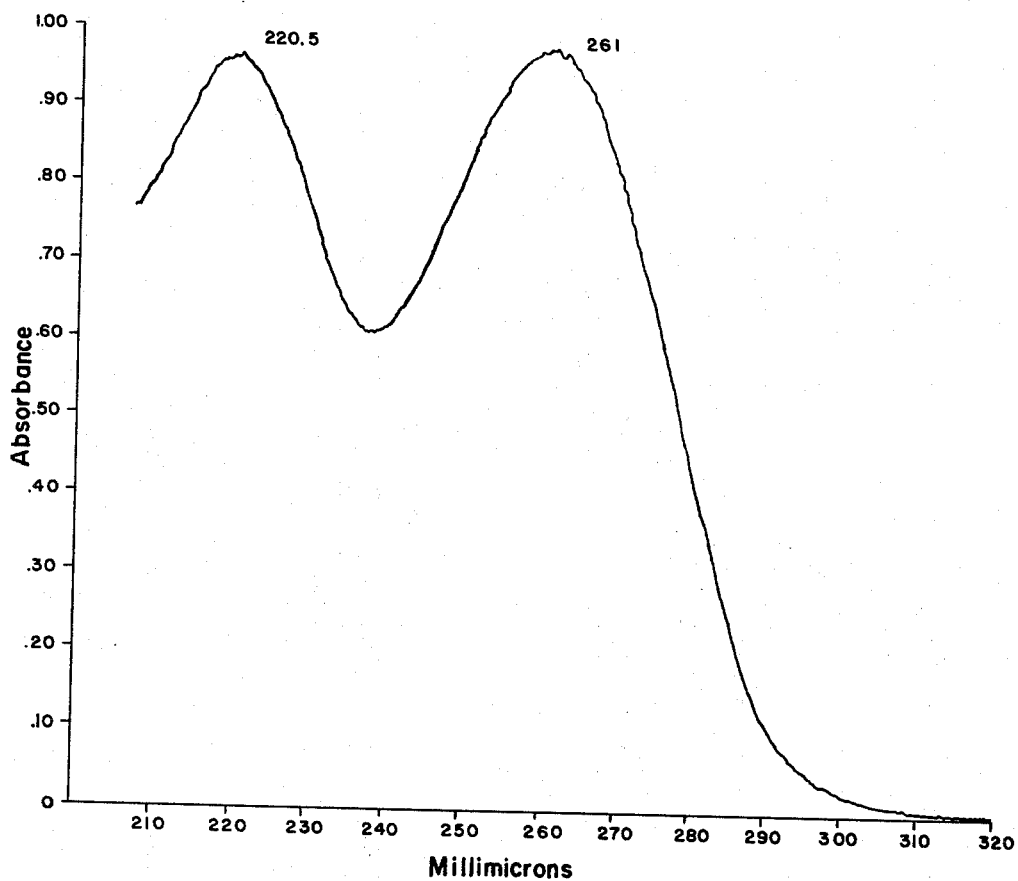
FIG. 1 represents an ultraviolet spectrum of the compound.

Table I lists absorption bands of the compound.

TABLE I.—ABSORPTION BANDS OF THE COMPOUND

| Wavelength | | Relative Intensity |
|---|---|---|
| Microns | Reciprocal Centimeters | |
| 3.33 | 3,000 | Weak. |
| 3.45 | 2,900 | Medium. |
| 4.40 | 2,274 | Weak. |
| 5.80 | 1,725 | Shoulder. |
| 5.87 | 1,705 | Strong. |
| 6.08 | 1,641 | Medium. |
| 6.26 | 1,598 | Weak-Medium. |
| 6.83 | 1,497 | Do. |
| 6.98 | 1,434 | Medium. |
| 7.08 | 1,413 | Do. |
| 7.26 | 1,379 | Do. |
| 7.39 | 1,353 | Do. |
| 7.52 | 1,330 | Weak. |
| 7.89 | 1,269 | Medium-Strong. |
| 8.21 | 1,219 | Strong. |
| 8.75 | 1,142 | Do. |
| 9.28 | 1,078 | Medium-Strong. |
| 9.60 | 1,042 | Shoulder. |
| 9.65 | 1,036 | Medium. |
| 10.02 | 980 | Medium-Strong. |
| 10.37 | 964 | Do. |
| 10.79 | 927 | Weak-Medium. |
| 11.27 | 887 | Shoulder. |
| 11.45 | 873 | Medium. |
| 11.67 | 856 | Shoulder. |
| 12.13 | 824 | Medium. |
| 12.32 | 811 | Shoulder. |
| 12.90 | 775 | Weak. |
| 13.60 | 735 | Do. |

The infrared spectrum is characterized by bands at 1705 cm.$^{-1}$ due to vibrations of an ester carbonyl, bands at 1479 and 1641 cm.$^{-1}$ for a conjugated diene, and the absence of hydroxyl bands.

The compound of the invention is further characterized by three main products of alkaline hydrolysis:

(1) Muconic acid,

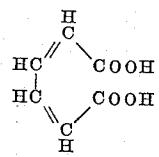

(2) An alcohol (A) which is characterized by crystals of a M.P. of 156°–157° C.;
A molecular formula: $C_{15}H_{22}O_4$
A molecular weight: 270–280 (Rast method); and two active hydrogens.
An infrared spectrum:
FIG. 3: infrared spectrum of the alcohol in a potassium bromide wafer.
Table II: list of infrared absorption bands.

TABLE II.—ABSORPTION BANDS OF ALCOHOL A

| Wavelength | | Relative Intensity |
|---|---|---|
| Reciprocal Centimeters | Microns | |
| 3,440 | 2.92 | Very strong. |
| 3,300 | 3.03 | Medium. |
| 2,920 | 3.42 | Do. |
| 1,690 | 5.93 | Weak. |
| 1,480 | 6.76 | Medium. |
| 1,450 | 6.90 | Do. |
| 1,380 | 7.25 | Do. |
| 1,335 | 7.48 | Do. |
| 1,325 | 7.55 | Do. |
| 1,312 | 7.62 | Do. |
| 1,292 | 7.74 | Do. |
| 1,282 | 7.80 | Do. |
| 1,245 | 8.04 | Weak. |
| 1,217 | 8.22 | Medium. |
| 1,162 | 8.60 | Do. |
| 1,125 | 8.88 | Do. |
| 1,105 | 9.05 | Do. |
| 1,089 | 9.18 | Strong. |
| 1,078 | 9.27 | Do. |
| 1,055 | 9.48 | Do. |
| 1,032 | 9.69 | Medium. |
| 1,015 | 9.85 | Do. |
| 985 | 10.14 | Do. |
| 962 | 10.40 | Strong. |
| 922 | 10.82 | Medium. |
| 892 | 11.23 | Do. |
| 873 | 11.45 | Do. |
| 855 | 11.70 | Do. |
| 832 | 12.02 | Do. |
| 818 | 12.22 | Do. |
| 772 | 12.95 | Do. |
| 756 | 13.22 | Do. |
| 732 | 13.67 | Do. |
| 653 | 15.31 | Do. |

Sharp absorption bands at the following frequencies, expressed in reciprocal centimeters and microns for Alcohol A:

TABLE III.—TRANSMITTANCE

| 0 to 25% | |
| --- | --- |
| Reciprocal Centimeters | Microns |
| 3,440 | 2.92 |
| 1,089 | 9.18 |
| 1,078 | 9.27 |
| 1,055 | 9.48 |
| 962 | 10.40 |

| 26 to 75% | |
| --- | --- |
| 3,300 | 3.03 |
| 2,920 | 3.42 |
| 1,480 | 6.76 |
| 1,450 | 6.90 |
| 1,380 | 7.25 |
| 1,335 | 7.48 |
| 1,325 | 7.55 |
| 1,312 | 7.62 |
| 1,292 | 7.74 |
| 1,282 | 7.80 |
| 1,217 | 8.22 |
| 1,162 | 8.60 |
| 1,125 | 8.88 |
| 1,105 | 9.05 |
| 1,032 | 9.69 |
| 1,015 | 9.85 |
| 985 | 10.14 |
| 922 | 10.82 |
| 892 | 11.23 |
| 873 | 11.45 |
| 855 | 11.70 |
| 832 | 12.02 |
| 818 | 12.22 |
| 772 | 12.95 |
| 756 | 13.22 |
| 732 | 13.67 |
| 653 | 15.31 |

The infrared spectrum of Alcohol A being characterized by:

Two hydroxyl bands at 3440 and 3300 cm.$^{-1}$ (in KBr);
A double bond band at 1690 cm.$^{-1}$; and
A band at 1380 cm.$^{-1}$ assignable to the vibrations of a C—CH$_3$ group (in KBr).

Alcohol A is further characterized by its diacetate:
Alcohol A—diacetate has a M.P. 147°–148° C. and a molecular formula of $C_{19}H_{26}O_6$ (calculated).

(3) The third product of mild alkaline hydrolysis of the compound is an $\alpha,\beta$-unsaturated carboxylic acid.

This acid shows an ultraviolet spectrum which shows a peak at 214 m$\mu$ and with a weak shoulder at 225 m$\mu$.

The acid shows an infrared spectrum which is represented in FIG. 4.

The chemical compound of the invention has the following properties, as determined by analysis:

Molecular formula: $C_{27}H_{32}O_8$
Calculated:
    Carbon 66.92
    Hydrogen 6.65
    Oxygen 26.30
Found (in percent):
    Carbon 66.51, 67.03
    Hydrogen 6.80, 6.77
    Oxygen 26.69, 25.20 (by difference)

Standard test for active hydrogen discloses the presence of one such hydrogen atom. Determinations show the absence of any alkoxy groups and the presence of at least three carbon-linked methyl groups. The compound decomposes over 210° C. It has an optical rotation (1.2% in benzene) as follows: $[\alpha]_D^{20} = 45°$ C. It forms a saturated tetrahydro compound by treatment with hydrogen in the presence of a hydrogenation catalyst.

The chemical compound of the invention may be obtained from a Fungi Imperfecti of the genus Myrothecium. A strain that is well suited for producing the chemical compound of the invention is *Myrothecium verrucaria* ATCC 13667 (American Type Culture Collection, Washington, D.C.)

The present invention is intended to include all strains of Myrothecium which produce the chemical compound of the invention, including mutants from the ATCC Strain No. 13667, which may be produced by various means, such as by X-ray radiation, ultraviolet radiation, cobalt radiation, nitrogen mustard, or by natural means, and the like.

The present invention also provides broths containing the compound which are useful in numerous pesticidal applications. Of special interest are those broths containing at least 0.1 microgram per milliliter of the chemical compound of the invention.

Further embodiments of the invention provide pesticidal compositions comprising the chemical compound of the invention.

In accordance with the metabolic process of the invention for preparing the chemical compound, a strain, producing the chemical compound of the invention, such as strain ATCC No. 13667, is grown aerobically in the presence of a nutrient medium. Essentially, the nutrient medium contains utilizable energy, assimilable carbon and nitrogen and nutrient salts. Suitable medium are known in the art. Particularly suitable are the various media and the method for growing the fungi disclosed in United States patent application No. 94,488, filed March 9, 1961, Muconomycin. When the concentration of the compound of the invention has reached the desired level, the compound of the invention may be recovered from the nutrient medium, and if desired, it may be purified to its crystalline form. The spent medium will generally contain at least 100 μg./ml. of the compound or its concentration may be higher, as from 150 to 2500 μg./ml. or higher. Alternatively, the spent nutrient medium containing the desired level of the compound of the invention may be employed, with or without concentrating, for various pesticidal applications.

In accordance with the invention, the chemical compound producing strains may be grown in the presence of the above-specified nutrient medium, which may be provided as a solid or as a liquid medium. When the medium is liquid, there may be provided shallow stationary trays for growing the fungi as surface or shallow cultures, but preferably the process of the invention comprises developing the chemical compound producing strain in aerated, agitated, submerged cultures.

When the concentration of the compound of the invention has reached the desired level in the aqueous medium, the Myrothecium-containing medium may be employed as such or the compound may be separated from the spent medium. Separation may be effectuated by filtration, centrifuging, or by other suitable methods. As separation aids, there may be employed diatomaceous earth or other filtration aids.

A convenient method for recovering the compound of the invention from nutrient broth is with the aid of suitable solvents for the compound of the invention, particularly water-immiscible ones. In this manner, there is obtained a solvent extract rich in the chemical compound which may be used as such or which may be further processed as described hereinafter.

These extracts are useful in combatting fungi. Further concentration and purification of the compound may be obtained by evaporating the solvent to yield an oily residue high in the compound. If even further degrees of purity are desired, the residue may be taken up in a water-miscible solvent for the compound such as acetone, methyl acetone, and the like. To this concentrate of the compound, there may then be added water to give approximately a 5% to 20%, preferably a 10%, aqueous solvent. This causes the formation of a milky white colloidal solution. Heat and agitation and cooling may be applied to promote precipitation of the compound.

Generally, at least 75% to 85% of pure compound is present in such a precipitate. It is a valuable composition of high toxicity to fungi.

Further purification to a crystalline compound may be obtained by recrystallization from solvents such as lower ketones, lower alkyl acetates, aromatic hydrocarbons and lower alcohols, halogenated hydrocarbons, benzene, and other suitable ones listed above. With water-miscible solvents, water may be a helpful adjuvant to promote crystallization. Crystalline forms of the compound may be particularly desirable in biological, pharmaceutical, and medical applications.

*Determination of the Potency of the Compound of the Invention by Standard Muconomycin*

*Bioactivity test.*—Concentration of the compound of the invention is determined by a modified agar plate diffusion method. Spores of Endomycopsis, collected from a potato-dextrose agar plate, are suspended in sterile water and standardized to about 10 million spores per milliliter of liquid by adjusting the number of spores to give a 60% light transmittancy at 525 m$\mu$ in a Junior Coleman Spectrophotometer. One milliliter of this spore suspension is mixed with 10 milliliters of liquefied potato-dextrose agar. The mixture is poured into Petri dishes where it is allowed to harden. Small wells, about 9 mm. in diameter, are cut in the agar and filled with 0.05 ml. of test solution. The plates are incubated at 26° C. for 26 hours. The potency of the test solution is measured by the diameter of the zone of inhibition. The diameter of the zone is compared and evaluated against a standard curve. That standard curve is determined by testing various concentrations of crystalline compound against Endomycopsis under the standard conditions described above and plotting the logarithm of the concentration per milliliter against the diameter of the zone of inhibition. A straight line is derived from which the concentration of the pure chemical compound in any sample may be read.

The following examples illustrate the preferred metabolic method for preparing the chemical compound of the invention, methods for treating it, and for preparing derivatives thereof. All parts are by weight unless specified otherwise. The examples are not to be considered as a limitation on the scope of the invention.

EXAMPLE 1

A sterile liquid medium comprising 3% cerelose, 0.5% peptone, 0.1% yeast extract, 0.05% potassium dibasic phosphate, 0.02% hydrated magnesium sulfate, and 3% rolled oats is adjusted to a pH of about 7 with alkali. It is dispensed in 100 ml. portions in 1 liter Erlenmeyer flasks. The flasks are inoculated with a final concentration of 1% spore suspension of a Myrothecium strain ATCC No. 13667 obtained from a potato-dextrose agar slant. Incubation is carried out on a shaker rotating at 260 r.p.m. in a constant temperature room at 25° to 28° C. After 65 hours, the pH of the fermentation broth is about 7. At that time, the concentration of the compound of the invention is 770$\mu$ g./ml. The mycelium is separated from the broth by filtration with diatomaceous earth.

Figure 2:
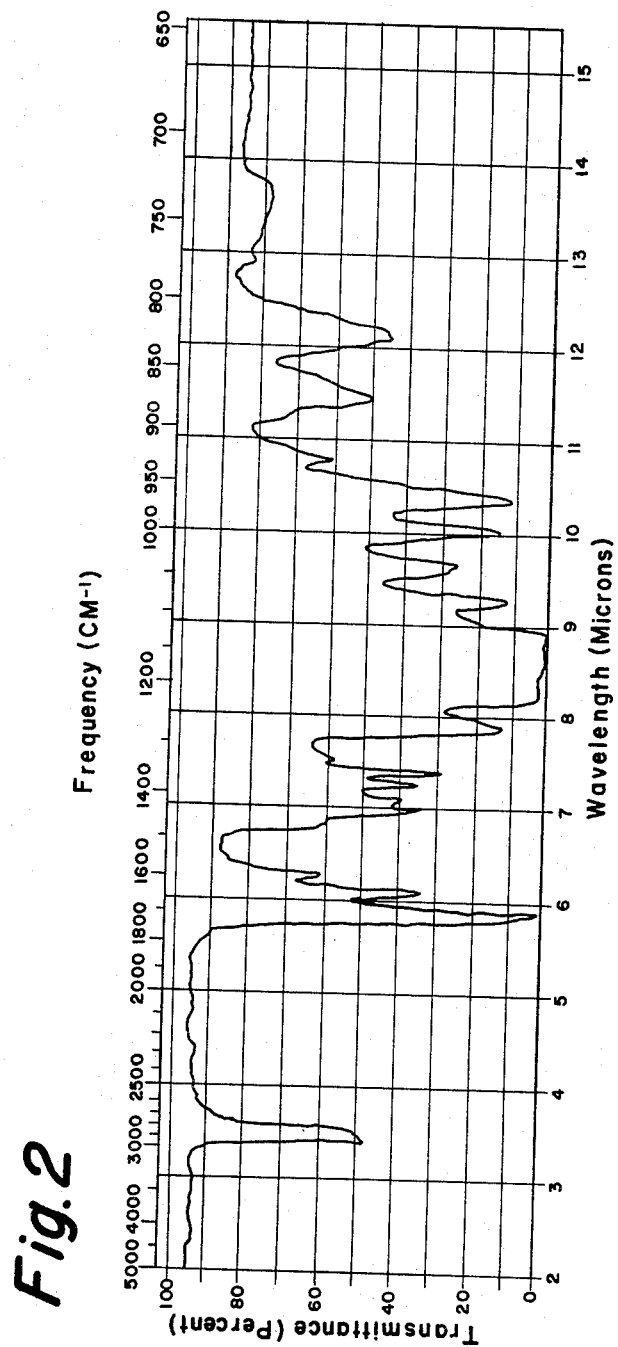
FIG. 2 represents an infrared spectrum of the compound (determination in potassium bromide wafer).

From the collected filtrate, the compound of the invention is isolated. Its molecular weight is 512±17, its molecular formula: $C_{27}H_{32}O_8$, its infrared spectrum is identical to that of FIGURE 2.

The collected filtrate is useful for combating fungal infestations, particularly those of *Phytophthora infestans*. It is also useful as a herbicide.

EXAMPLE 2

The chemical compound of this invention is hydrolyzed by the following method.

403.6 parts of the chemical compound of this invention is placed in a small flask with 2 ml. of ethanol and 8 ml. of 3% sodium hydroxide. A reflux condenser is attached and the mixture is heated at reflux on a steam bath for a period of 1 hour. The reaction mixture is then cooled to room temperature and filtered to remove any solid matter in suspension. The filtrate is extracted several times with chloroform and the extracts combined and dried over anhydrous magnesium sulfate. After removing the drying agent and solvent, a crystalline residue remains which, after one crystallization from ether, melts at 154°–155° C., weight 82.8 parts.

EXAMPLE 3.—ALCOHOL A COMPONENT

The residue from above is dissolved in chloroform and recrystallized from an ether chloroform solution yielding flat needles of melting point 156°–157° C. Analysis shows $C_{15}H_{22}O_4$: carbon 67.38% (theoretical 67.64%), hydrogen 8.38% (theoretical 8.32%), oxygen 23.93% (theoretical 24.02%), molecular weight (Rast) 270 and 280 (theoretical 267.4).

The infrared spectrum of this component shows hydroxyl bands at 3440 and 3300 cm.$^{-1}$, a weak double bond band at 1690 cm.$^{-1}$, and a band at 1380 cm.$^{-1}$ assignable to the vibrations of a C—CH$_3$ group.

EXAMPLE 4.—MUCONIC ACID COMPONENT

The basic reaction mixture from above is then made strongly acidic with 6 N hydrochloric acid and extracted with ether. After drying the combined extracts and removing the solvent, a powder is obtained as residue. The residue is washed with chloroform and collected on a filter, weight 50 parts, melting point 189.6°–190.5° C.

This acid component (57.4 parts) is reduced over palladium on charcoal, in ethanol. Two moles of hydrogen are absorbed per mole of acid. The product is a white solid melting at 152°–153° C. The infrared spectrum of the reduced acid is superimposable on that of adipic acid. A mixture melting point determination with adipic acid shows no depression. This and further identification confirms that this acid component of the chemical is muconic acid.

EXAMPLE 5.—$\alpha,\beta$-UNSATURATED CARBOXYLIC ACID

The acidified reaction mixture is then extracted with chloroform and the chloroform dried and removed. A colorless oil remains as a residue. The infrared spectrum of the oil shows it to be an unsaturated $\alpha,\beta$-unsaturated carboxylic acid. The carboxylic acid is further characterized by:

(a) An ultraviolet spectrum showing a strong band at 214 m$\mu$ with a weak shoulder at 255 m$\mu$.

(b) The infrared spectrum is shown as FIGURE 4.

The chemical compound of the invention is a unique compound which exhibits an antifungal spectrum of remarkable toxicity. The two following tables illustrates the high toxicity and specificity of the chemical compound on fungi.

Table IV shows the antifungal effect of the chemical compound of the invention. Table V lists typical bacteria which are found unaffected by 50 gammas/milliliter of the chemical compound of the invention.

Toxicity against fungi is determined by seeding a suitable nutrient broth containing varying amounts of the chemical compound of the invention and determining the minimal concentration of the chemical compound of the invention which fully inhibits growth of the microorganism tested. Incubation is at 26° C. for 48 hours.

Effect on bacteria is determined by adding the chemical compound of the invention in increasing amounts up to 50 $\mu$g./ml. to test solutions of suitable melted nutrient agar. The tests are run by cross-streaking nutrient agar containing various dilutions of the antibiotic with test microorganisms and determining the minimal concentration of the chemical compound of the invention which will fully inhibit growth of the microorganism tested. The nutrient agar containing the compound of the invention is dispensed into Petri dishes where it is allowed to harden. Controls are muconate-free plates. The surface of the plates are streaked with a heavy culture of the bacterium to be tested. Good growth of the bacterium after 48 hours' incubation at 30° C. indicates lack of toxicity of the chemical compound of the invention on the bacteria up to this level of the chemical compound of the invention. No growth at this time is a demonstration of the toxicity of the chemical compound of the invention against the particular bacteria tested.

TABLE IV.—ANTIFUNGAL EFFECT OF THE COMPOUND OF THE INVENTION

| Fungi | Inhibitory Concentration in p.p.m. |
|---|---|
| Botrytis cinerea | 0.125 |
| Pythium ultimum | 5.0 |
| Alternaria oleracea | 2.5 |
| Aspergillus niger | 25.0 |
| Fusarium solani | 2.5 |
| Chaetomium globosum | 10.0 |
| Phytophthora infestans | 0.25 |

TABLE V.—BACTERIA UNAFFECTED BY 50 GAMMA/MILLILITER OF MUCONOMYCIN

*Erwinia carotovora, Escherichia coli, Shigella sonnei, Bacillus subtilis, Bacillus mesentericus, Proteus morgani, Staphylococcus aureus,* and *Streptococcus faecalis.*

The toxicity of the compound of this invention makes it valuable for combatting fungal infections on materials and products susceptible to fungal growth.

The compound of this invention is generally used in compositions in which the active agent is mixed with an inert carrier. Dusts may be prepared by mixing a compound with a finely divided solid, such as talc, clay, pyrophyllite, diatomaceous earth, hydrated silica, or magnesium carbonate. If desired, wetting and/or dispersing agents may be admixed. When the proportion of these agents is increased, there results a wettable powder, which may be taken up in water and applied from a spray.

The dusts may contain 1% to 15% of the compound of the invention, which the wettable powders may contain up to 50% or even more of one or both of these compounds.

A typical formulation of a wettable powder comprises 20 to 50% of active agent, 45 to 75% of one or more finely divided solids, 1 to 5% of a wetting agent, and 1 to 5% of a dispersing agent. Typical wetting agents include sodium dodecyl sulfate, sodium sulfosuccinate, sodium alkylbenzenesulfonates, alkylphenoxypolyethoxyethanol, or other non-ionic, such as the ethylene and/or propylene oxide condensates with long-chained carboxylic acids, alcohols, or mercaptans.

A composition comprising the compound of the invention is also evaluated for its activity against late blight on tomato plants. In this evaluation test, young plants are sprayed with a suspension of the powder under tests at several concentrations, dried and sprayed with a suspension of spores of *Phytophthora infestans*. Some plants are sprayed only with a suspension of sprays as controls. All plants are held under careful, controlled conditions of temperature and moisture. Counts are made of Phytophthora lesions which result in the $ED_{50}$ determination. $ED_{50}$ values of 3.8 p.p.m. are found for the compound of the invention, $ED_{50}$ being the effective dosage required to bring about a 50% inhibition of the infective lesions produced by *Phytophthora infestans* on the plant.

The compound of the invention is also used in herbicidal applications in post-emergence applications. For instance, they are useful in controlling monocotyledenous and dicotyledenous plants, such as crabgrass, foxtail, millet, wheat, ryegrass, wild oats, and Johnson grass, and beans, flax, pepper, grass, plantain, lamb's-quarters, chickweed, curly dock, pigweed, ragweed, scarlet pimpernel, and purslane, when applied at the rate of 10 lbs./acre. In such agricultural applications, the compound of the invention may be formulated as dusts above in the form of powders or as solutions with or without emulsifying agents.

This is a continuation-in-part of United States patent application No. 94,488, filed March 9, 1961, Muconomycin, now U.S. Patent 3,087,859.

We claim:
1. A compound characterized by the following analysis:
   A molecular formula of: $C_{27}H_{32}O_8$;
   The presence of the following atoms, in the stated percentage is found:
       Carbon 66.77
       Hydrogen 6.78
       Oxygen 25.94
   A molecular weight of: $512 \pm 17$;
   An optical rotation: $[\alpha]_D^{20} = +45°$ (c. 1.2% in benzene);
   Its ultraviolet spectrum shows two peaks, λ max.: 261 mμ and 220.5 mμ;
   Its infrared spectrum (in a potassium bromide wafer) shows absorption bands at the following frequencies expressed in reciprocal centimeters: 3000, 2900, 2274, 1725, 1705, 1641, 1598, 1497, 1434, 1413, 1379, 1353, 1330, 1269, 1219, 1142, 1078, 1042, 1036, 980, 964, 927, 887, 873, 856, 824, 811, 775, and 735.
2. A composition comprising the compound of claim 1 and water.
3. A composition comprising the compound of claim 1 and an adjuvant.

References Cited in the file of this patent

Brian et al.: Nature, vol. 157, page 334, 1946.